(12) United States Patent
Kamiya

(10) Patent No.: US 7,792,133 B2
(45) Date of Patent: Sep. 7, 2010

(54) PACKET RELAY DEVICE AND PACKET METHOD, AND PROGRAM

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 886 days.

(21) Appl. No.: 10/546,718

(22) PCT Filed: May 25, 2004

(86) PCT No.: PCT/JP2004/007470

§ 371 (c)(1),
(2), (4) Date: Aug. 24, 2005

(87) PCT Pub. No.: WO2004/107683

PCT Pub. Date: Dec. 9, 2004

(65) Prior Publication Data

US 2006/0153225 A1 Jul. 13, 2006

(30) Foreign Application Priority Data

May 29, 2003 (JP) .............................. 2003-152156

(51) Int. Cl.
*H04L 12/28* (2006.01)
*H04L 12/56* (2006.01)
*H04J 3/24* (2006.01)
*H04J 3/22* (2006.01)
(52) U.S. Cl. ...................................... 370/422; 370/474
(58) Field of Classification Search ............ 370/395.52, 370/355
See application file for complete search history.

(56) References Cited

U.S. PATENT DOCUMENTS 6,826,613 B1 * 11/2004 Wang et al. ................. 709/227

(Continued)

FOREIGN PATENT DOCUMENTS

JP 9-36908 2/1997

(Continued)

OTHER PUBLICATIONS

H. Chan, H. Alnuweiri, and V. Leung, A framework for optimizing the cost and performance of next-generation IP routers, IEEE JSAC, vol. 17, No. 6, pp. 1013-1029, Jun. 1999.*

*Primary Examiner*—Daniel J. Ryman
*Assistant Examiner*—Christopher Crutchfield
(74) *Attorney, Agent, or Firm*—McGinn IP Law Group, PLLC

(57) ABSTRACT

A relay device (1) includes a plurality of network processing units (200-1~200-N) having the same function and structure. A session management unit (202-1) in a certain network processing unit (e.g. 200-1), when receiving a packet from an external network through an IF unit (e.g. 204-1-1) in the same processing unit, searches a session table (230-1) for IF specifying information indicative of an IF unit as an output destination determined for a session to which the above packet belongs. When the above IF specifying information indicates an IF unit (e.g. 204-N-M) in other network processing unit (e.g. 200-N), a packet processing unit (201-1) transfers the above IF specifying information and the above packet to the network processing unit (200-N) through a switch unit (300). A packet processing unit (201-N) in the network processing unit (200-N) outputs the above packet to the IF unit (204-N-M) represented by the IF specifying information.

17 Claims, 19 Drawing Sheets

U.S. PATENT DOCUMENTS

| | | | |
|---|---|---|---|
| 2002/0143955 A1* | 10/2002 | Shimada et al. | 709/227 |
| 2004/0090965 A1* | 5/2004 | Lin | 370/395.21 |
| 2005/0074000 A1* | 4/2005 | Yokoyama et al. | 370/386 |
| 2008/0013532 A1* | 1/2008 | Garner et al. | 370/389 |
| 2008/0114887 A1* | 5/2008 | Bryers et al. | 709/230 |

FOREIGN PATENT DOCUMENTS

| | | |
|---|---|---|
| JP | 11-261641 | 9/1999 |
| JP | 2000-354061 | 12/2000 |
| JP | 2002-354015 | 12/2002 |
| JP | 2002-359637 | 12/2002 |

\* cited by examiner

SESSION TABLE PROCESSING

FIG. 10

SESSION TABLE 230-1

| | SEARCH KEY | | | | | | SEARCH RESULT | |
|---|---|---|---|---|---|---|---|---|
| SESSION ID | TRANSMISSION SOURCE IP ADDRESS | TRANSMISSION SOURCE PORT NUMBER | PROTOCOL | DESTINATION IP ADDRESS | DESTINATION PORT NUMBER | TRANSMISSION SOURCE STATE | INPUT PHYSICAL IF NUMBER | OUTPUT PHYSICAL IF NUMBER |
| 1-1 | 192.168.1.1 | 1025 | TCP | 192.168.10.1 | 80 | Establish | 1-1 | 2-1 |
| 1-2 | 192.168.100.15 | 80 | TCP | 192.168.6.2 | 12300 | Establish | 1-2 | 3-2 |

FIG.11

SESSION TABLE 230-2

| SESSION ID | SEARCH KEY | | | | | SEARCH RESULT | | |
|---|---|---|---|---|---|---|---|---|
| | TRANSMISSION SOURCE IP ADDRESS | TRANSMISSION SOURCE PORT NUMBER | PROTOCOL | DESTINATION IP ADDRESS | DESTINATION PORT NUMBER | TRANSMISSION SOURCE STATE | INPUT PHYSICAL IF NUMBER | OUTPUT PHYSICAL IF NUMBER |
| 2-1 | 192.168.10.1 | 80 | TCP | 192.168.1.1 | 1025 | Establish | 2-1 | 1-1 |

FIG.12

SESSION TABLE 230-3

| SESSION ID | SEARCH KEY | | | | | SEARCH RESULT | | |
|---|---|---|---|---|---|---|---|---|
| | TRANSMISSION SOURCE IP ADDRESS | TRANSMISSION SOURCE PORT NUMBER | PROTOCOL | DESTINATION IP ADDRESS | DESTINATION PORT NUMBER | TRANSMISSION SOURCE STATE | INPUT PHYSICAL IF NUMBER | OUTPUT PHYSICAL IF NUMBER |
| 3-1 | 192.168.6.2 | 12300 | TCP | 192.168.100.15 | 80 | Establish | 3-2 | 1-2 |

FIG.13

POLICY TABLE

| ACL-ID | SEARCH KEY ||||| SEARCH RESULT |
|---|---|---|---|---|---|---|
| | TRANSMISSION SOURCE IP ADDRESS | TRANSMISSION SOURCE PORT NUMBER | PROTOCOL | DESTINATION IP ADDRESS | DESTINATION PORT NUMBER | POLICY |
| 1 | 192.168.1.0/24 | ANY | TCP | 192.168.10.1 | 80 | PASS |
| 2 | 192.168.100.0/24 | ANY | TCP | 192.168.6.2 | 80 | PASS |
| 3 | ANY | ANY | ANY | ANY | ANY | ABANDON |

FIG. 14

IF FRAGMENTATION TABLE 240-1

| FRAGMENT ID | SEARCH KEY | | | | SEARCH RESULT | | |
|---|---|---|---|---|---|---|---|
| | TRANSMISSION SOURCE IP ADDRESS | DESTINATION IP ADDRESS | PROTOCOL | FLAG AND FRAGMENT OFFSET | POLICY | INPUT PHYSICAL IF NUMBER | OUTPUT PHYSICAL IF NUMBER |
| 1 | 192.168.1.1 | 192.168.10.1 | TCP | A | PASS | 1-1 | 2-1 |
| 2 | 192.168.7.1 | 192.168.0.10 | TCP | B | ABANDON | 1-1 | (null) |

FIG.15

ROUTING TABLE

| | SEARCH KEY | SEARCH RESULT |
|---|---|---|
| ROUTING ID | DESTINATION IP ADDRESS | OUTPUT PHYSICAL IF NUMBER |
| 1 | 192.168.10.0/28 | 2−1 |
| 2 | 192.168.6.0/28 | 3−2 |
| 3 | 192.168.10.0/24 | 1−1 |
| 4 | 192.168.100.0/24 | 1−2 |
| ⋮ | ⋮ | ⋮ |

FIG. 16

SESSION PROCESSING PACKET INFORMATION

| PACKET ID | TABLE SEARCH KEY AND DETERMINATION INFORMATION | | | SEARCH AND DETERMINATION RESULT | |
|---|---|---|---|---|---|
| | INPUT PHYSICAL IF NUMBER | IP HEADER | TCP/UDP HEADER | SESSION PROCESSING OPERATION INFORMATION | POLICY | OUTPUT PHYSICAL IF NUMBER |

FIG. 17

EXPANSION HEADER IN DEVICE

| SESSION PROCESSING OPERATION INFORMATION | POLICY | INPUT PHYSICAL IF NUMBER | OUTPUT PHYSICAL IF NUMBER |
|---|---|---|---|

PACKET RELAY DEVICE AND PACKET METHOD, AND PROGRAM

FIELD OF THE INVENTION

The present invention relates to a packet relay device which requires session management.

DESCRIPTION OF THE RELATED ART

At present, use of the Internet has been rapidly spreading such as those for Web, E-mail, cellular phones and E-commerce. New services have been also provided such as Web services by Voice over IP (VoIP) and Extensible Markup Language (XML). Increasing demands for speeding up a network and for high performance such as security or the like follow. Most demanded is realizing determination for each session whether passing is allowed or not, QoS (Quality of Service) control and priority control, with a series of traffic flows which can be identified by a combination of a transmission source and a destination and whose representatives are a TCP session, Web traffic and VoIP traffic considered as a "session".

TCP session is a packet traffic flow which can be specified by "transmission source IP address", "destination IP address", "protocol", "transmission source port number" and "destination port number" in a TCP/IP packet. In a TCP session, upon transmission of a packet (referred to as an SYN packet) with an SYN flag in a TCP header set, the session is opened and upon transmission of a packet (FIN packet) with an FIN flag set, the session is closed.

FIG. 19 shows one example of state transition from opening to closing of a TCP session. In a case of TCP communication between a client and a server, first an SYN packet is transmitted from the client. After receiving the SYN packet, the server transmits an SYN ACK packet and the client responsively transmits an ACK packet. The foregoing processing establishes a TCP session between the client and the server. Hereafter, the client and the server transmit and receive packets therebetween. When closing the session, in a case, for example, where the client closes the session, the client transmits an FIN packet, and after receiving the FIN packet, the server transmits the ACK packet and the FIN packet and the client responsively transmits the ACK packet. The foregoing processing closes the session.

Also in UDP, a packet traffic flow can be specified by "transmission source IP address", "destination IP address", "protocol", "transmission source port number" and "destination port number". This is referred to as a virtual session. Because unlike TCP, neither an SYN flag nor an FIN flag is defined in a packet in UDP, none of explicit session opening and closing is specified. Therefore, it is a common practice in a UDP virtual session to determine, with packet arrival as session opening, when a timer senses a relevant UDP packet failing to arrive for a fixed time period, that the session is closed. In VoIP, Session Initiate Protocol (SIP) explicitly notifies opening and closing of a UDP virtual session.

Furthermore, there exists in http or https as a Web communication protocol, a session identifying function by a Uniform Resource Locator (URL) or a Cookie between a Web browser as a client side and a Web server as a server side. In communication between the client and the server, packets, whose combinations between a transmission source port and a destination port are different, are determined to be traffic belonging to the same session when having a URL or a Cookie of the same location. Similarly to a UDP virtual session, these realize session management by packet arrival and time-out by a timer or explicit session closing notification by a higher order protocol.

In each of the foregoing "sessions", it is demanded to make determination of its opening and ending for each packet. High-speed dynamic management of a "session" is required from a packet relay device.

Among packet relay devices which execute conventional session management, well known is, for example, that having the structure shown in FIG. 20 (e.g. see Japanese Patent Laying-Open No. 2002-359637).

With reference to FIG. 20, a conventional packet relay device is formed of a server 100a and a network processing unit 200. In the figure, a control signal line is indicated by a thin arrow and a packet transmission path by a large arrow.

The server 100a has a network control unit 110a provided therein, which network control unit 110a writes routing information and policy information applied by a manager into a routing table 210 and a policy table 220 in the network processing unit 200.

The network processing unit 200 includes a packet processing unit 201, a session management unit 202, a routing processing unit 203, IF (Interface) units 204-1 to 204-M, the routing table 210, the policy table 220 and a session table 230. Packet transmission and reception processing, session management processing, routing processing and the like are executed in the network processing unit 200.

A packet (not shown) applied from an external network through the IF unit 204-$i$ ($1 \leq i \leq M$) is transmitted to the packet processing unit 201 and after being subjected to packet reception processing, transmitted to the session management unit 202. The session management unit 202 refers to the session table 230 to execute determination on a registered session related to the arriving packet. When detecting registration of the packet in the session table, the session management unit 202 transfers the packet to the packet processing unit 201 in order to transfer the same to the IF unit 204-$j$ ($1 \leq j \leq M$) as an output destination according to the registration contents. When the packet is yet to be registered in the session table 230, the session management unit 202 executes determination whether passing is allowed or not with reference to the policy table 220. At the same time, the routing processing unit 203 refers to the routing table 210 to identify the IF unit 204-$j$ as the output destination. The session management unit 202 registers the result of the search in the policy table 220 and the routing table 210 as new registration session information in the session table 230. In order to be transferred to the output destination interface, the packet is transferred to the packet processing unit 201. After being subjected to packet transmission processing, the packet transferred to the packet processing unit 201 is output to the external network through the IF unit 204-$j$.

Thus structured conventional packet relay device has a structure in which all the input and output packets are concentrically processed by one session management unit, so that packet processing performance at the session management unit might bottleneck performance of the entire device.

The above-described conventional packet relay device has another problem that session management of a fragmented IP packet can not be realized.

Accordingly, an object of the present invention is to improve session management processing performance in a packet relay device.

Another object of the present invention is to realize session management for a fragmented IP packet.

SUMMARY OF THE INVENTION

According to a first packet relay device of the present invention, in order to improve session management processing performance, a packet relay device which relays a packet is provided with a plurality of network processing units (200-1~200-N), in which the plurality of network processing units (200-1~200-N), when each receiving a packet from an external network, on condition that an IF unit as an output destination determined for a session to which the packet belongs exists in other network processing unit, transmit said packet and IF specifying information which specifies said IF unit to said other network processing unit and when receiving a packet and IF specifying information from other network processing unit, output said packet to an IF unit specified by said IF specifying information.

According to a second packet relay device of the present invention, in order to improve session management processing performance, a packet relay device which relays a packet is provided with the plurality of network processing units (200-1~200-N) and a switch unit (300) which connects the plurality of network processing units (200-1~200-N) with each other, in which said plurality of network processing units (200-1~200-N), when each receiving a packet from an external network, on condition that an IF unit as an output destination determined for a session to which the packet belongs exists in other network processing unit, input said packet and IF specifying information which specifies said IF unit to said switch unit (300) and when receiving a packet and IF specifying information through said switch unit (300), output said packet to an IF unit specified by said IF specifying information, and said switch unit (300) transfers the input packet and IF specifying information to a network processing unit having an IF unit specified by the IF specifying information.

More specifically, a third packet relay device according to the present invention is structured such that in the second packet relay device, said plurality of network processing units (200-1~200-N) respectively include session tables (230-1~230-N) in which registered correlated with session specifying information which specifies a session is IF specifying information of an IF unit to be an output destination of a packet belonging to the session, session management units (202-1~202-N) which, when receiving a packet from said external network, search said session tables (230-1~230-N) for IF specifying information of an IF unit to be an output destination of the packet, and packet processing units (201-1~201-N) which, when the IF specifying information of the IF unit to be an output destination of said packet which is searched from said session tables (230-1~230-N) by the session management units (202-1~202-N) indicates an IF unit existing in other network processing unit, input said packet and said IF specifying information to said switch unit (300) and when a packet and IF specifying information are sent from other network processing unit through said switch unit (300), output said packet to an IF unit specified by said IF specifying information.

In order to maintain consistency of a session table in each network processing unit without executing such time-consuming processing as table copying processing when a new session is established, a fourth packet relay device according to the present invention is structured such that in the third packet relay device, said respective network processing units (200-1~200-N) respectively include routing tables (210-1~210-N) in which registered correlated with a destination IP address of a packet is IF specifying information of an IF unit to be an output destination of the packet, said session management units (202-1~202-N), when failing to search IF specifying information of the IF unit to be an output destination of said packet from said session tables (230-1~230-N), search said routing tables (210-1~210-N) for IF specifying information of the IF unit to be an output destination of said packet to register the searched IF specifying information and session specifying information of a session to which said packet belongs so as to correlate with each other in said session tables (230-1~230-N) and when a packet, IF specifying information and an addition instruction are sent through said switch unit (300), register IF specifying information included in said addition instruction as IF specifying information indicative of an IF unit as an output destination in said session tables (230-1~230-N), as well as registering session specifying information of a session to which said packet belongs so as to correlate with the IF specifying information, said packet processing units (201-1~201-N), when IF specifying information of the IF unit to be an output destination of said packet which is searched from said routing tables (210-1~210-N) by said session management units (202-1~202-N) indicates an IF unit existing in other network processing unit, apply said packet, said IF specifying information and an addition instruction including the IF specifying information of the IF unit which has received said packet to said switch unit (300), and said switch unit (300) transfers the applied packet, IF specifying information and addition instruction to a network processing unit having the IF unit specified by said IF specifying information.

In order to manage a policy for each session, a fifth packet relay device according to the present invention is structured such that in the fourth packet relay device, said plurality of network processing units (200-1~200-N) respectively include policy tables (220-1~220-N) in which registered correlated with session specifying information which specifies a session is a policy of the session, and said session management units (202-1~202-N), when failing to search said session tables (230-1~230-N) for IF specifying information of an IF unit to be an output destination of said packet, on condition that a policy of a session to which said packet belongs that is registered in said policy table allows packet passing, search said routing tables (210-1~210-N) for IF specifying information of an IF unit to be an output destination of said packet to register the searched IF specifying information and session specifying information of the session to which said packet belongs so as to correlate with each other to said session tables (230-1~230-N) and when a packet, IF specifying information and an addition instruction are sent through said switch unit (300), register IF specifying information included in said addition instruction as IF specifying information indicative of an IF unit to be an output destination, as well as registering session specifying information of the session to which said packet belongs so as to correlate with the IF specifying information to said session tables (230-1~230-N).

In order to delete information related to a session from a session table at the time of closing the session, a sixth packet relay device according to the present invention is structured such that in the fourth packet relay device, said session management units (202-1~202-N), when receiving a packet which closes a session from said external network, delete information related to a session to which said packet belongs from said session tables (230-1~230-N) and when a packet, IF specifying information and a deletion instruction are applied through said switch unit (300), delete the information related to the session to which said packet belongs from said session tables (230-1~230-N), and said packet processing units (201-1~201-N), when an IF unit to be an output destination of a packet which closes said session exists in other network processing device, apply said packet, IF specifying information of the IF unit to be an output destination of said packet and a deletion instruction to said switch unit (300).

On the other hand, even when entering a state where an FIN packet can not be received due to line break-down or the like, in order to prevent a session belonging to the above FIN packet from wastefully using an entry in a session table, a seventh packet relay device according to the present invention is structured such that in the fourth packet relay device, said session management units (202-1~202-N), when registering a pair of session specifying information and IF specifying information in said session tables (230-1~230-N), register a predetermined time-out value together with the information, as well as decrementing each time-out value registered in the session table by a fixed value at fixed time intervals to delete an entry whose decremented time-out value goes equal to or below a predetermined value.

In order to realize session management for a fragment IP packet, an eighth packet relay device according to the present invention is structured such that in the third packet relay device, said plurality of network processing units (200-1~200-N) respectively include routing tables (210-1~210-N) in which IF specifying information of an IF unit to be an output destination of a packet is registered so as to correlate with a destination IP address of the packet and IP fragmentation tables (240-1~240-N) having entries in which a fragment offset and IF specifying information of an IF unit to be an output destination of the packet are registered so as to correlate with a transmission source IP address and a destination IP address of the packet, and said session management units (202-1~202-N), when receiving a fragment IP packet through an external network, search said IP fragmentation tables (240-1~240-N), when there exists an entry in which the same transmission source IP address, destination IP address and fragment offset as a transmission source IP address, a destination IP address and a fragment offset of said fragment IP packet are registered, obtain IF specifying information in said entry, as well as updating the fragment offset in said entry based on a packet length of said fragment IP packet, and when there exists no relevant entry in said IP fragmentation tables (240-1~240-N), search said session tables (230-1~230-N) or said routing tables (210-1~210-N) for IF specifying information of an IF unit to be an output destination of said fragment IP packet to add and register an entry including the searched IF specifying information and the transmission source IP address, the destination IP address and the fragment offset in said fragment IP packet.

Arranging the session management units dispersedly in a plurality of network processing units enables the packet relay device according to the present invention to prevent session search processing and session registration addition and deletion processing at the session management unit from bottlenecking.

In addition, since in the packet relay device according to the present invention, processing of searching the session table, the policy table and the IP fragmentation table is executed only once in the session management unit in the network processing unit which has received a packet from an external network, table searching processing will not bottleneck.

In the packet relay device according to the present invention, when a packet received from an external network is a packet of a new session, that is, when information related to a session to which the above packet belongs is yet to be registered in the session table, an input side network processing unit adds a session entry to the session table in its own processing unit, as well as transferring an addition instruction when transferring the packet to an output side network processing unit having an IF unit to be an output destination, and the output side network processing unit executes processing of adding the session entry to the session table in its own processing unit. As a result, in the session table in each of the network processing units which are paired as an input and an output, the contents of the session tables will be automatically equalized, so that the equality of the session tables in different network processing units can be maintained without special processing of copying a session table.

Moreover, dispersedly arranging the session management units enables a combination of the network processing unit and the switch unit to improve session processing capacity of the entire system.

Furthermore, executing only the processing of registering a new session at an output side network processing unit while omitting session searching processing and policy obtaining processing enables further reduction of a time required for a packet to pass through the device (latency) as compared with a method in which session search processing and policy obtaining processing are executed on both input and output side network processing units.

BRIEF DESCRIPTION OF THE DRAWINGS

FIG. 10 is a diagram showing an example of a structure of a session table.

FIG. 11 is a diagram showing an example of a structure of a session table.

FIG. 12 is a diagram showing an example of a structure of a session table.

FIG. 13 is a diagram showing an example of a structure of a policy table master 120 and policy tables 220-1~220-N.

FIG. 14 is a diagram showing an example of a structure of IP fragmentation tables 240-1~240-N.

FIG. 15 is a diagram showing an example of a structure of a routing table master 110 and routing tables 220-1~220-N.

FIG. 16 is a diagram showing an example of arrangement of session processing packet information.

FIG. 17 is a diagram showing an example of arrangement of an expansion header in the device.

DESCRIPTION OF THE PREFERRED EMBODIMENT

Next, an embodiment of the present invention will be detailed with reference to the drawings.

Figure 1:
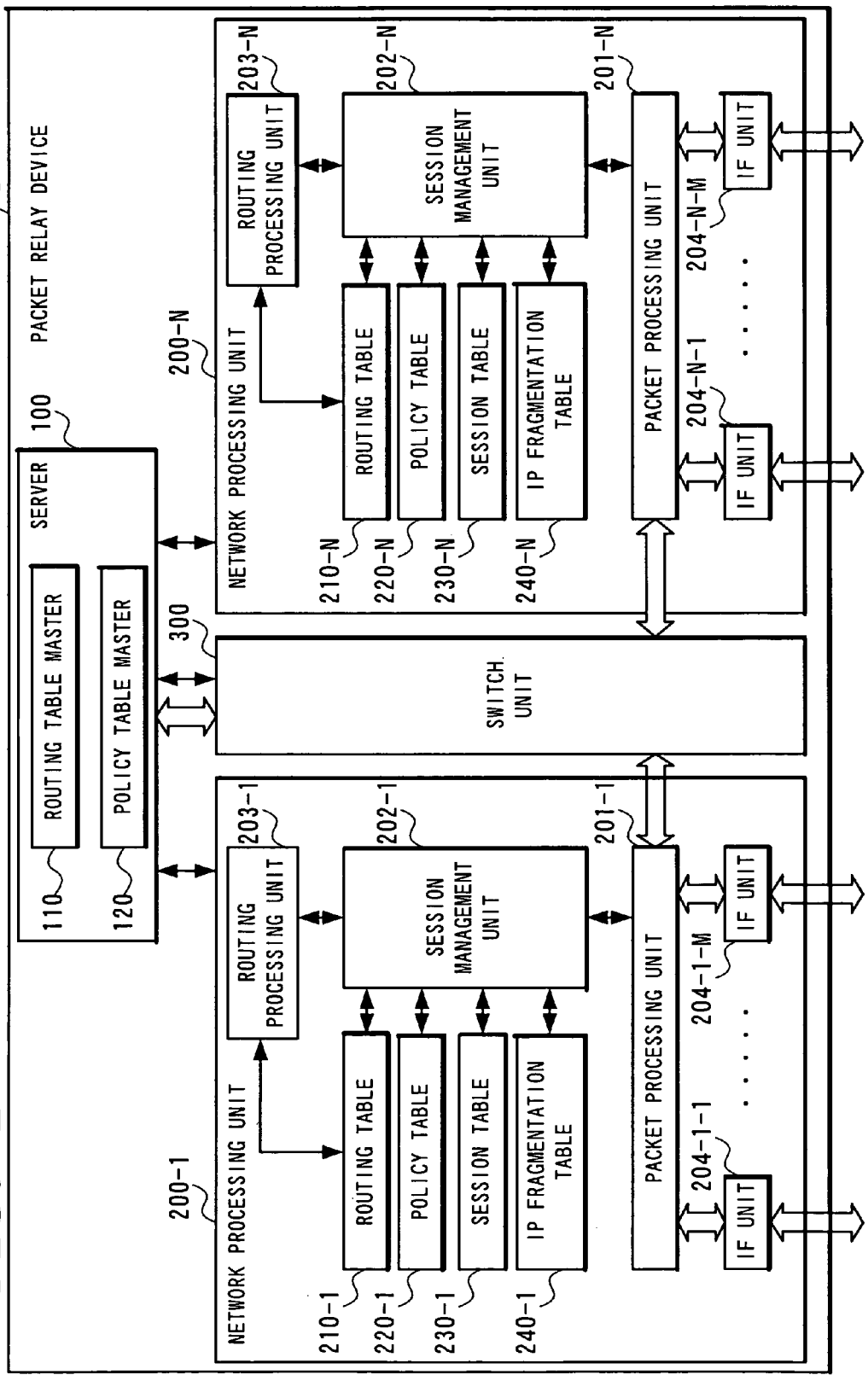
FIG. 1 is a diagram showing a structure of a packet relay device according to an embodiment of the present invention.

FIG. 1 shows an example of a structure of a packet relay device 1 according to an embodiment of the present invention.

In the figure, the packet relay device 1 includes a server 100, the plurality of network processing units 200-1~200-N and the switch unit 300.

The server 100 includes a routing table master 110 and a policy table master 120.

The server 100 is connected to the plurality of network processing units 200-1~200-N through a control signal line. The server 100 is connected to the switch unit 300 through the control signal line and a packet transmission path. In the figure, the control signal line is denoted by a thin arrow and the packet transmission path is denoted by a large arrow.

The server 100 writes routing information externally applied by a manager into the routing table master 110. In addition, policy information externally applied by the manager is written into the policy table master 120. The routing information and the policy information written into the routing table master 110 and the policy table master 120 are written into the routing tables 210-1~210-N and the policy tables 220-1~220-N in the respective network processing units 200-1~200-N through the control signal line.

The plurality of the network processing units 200-1~200-N have the same structure. Description will be made of the network processing unit 200-1 as a representative example.

The network processing unit 200-1 includes the packet processing unit 201-1, the session management unit 202-1, a routing processing unit 203-1, a plurality of IF units 204-1-1~204-1-M, the routing table 210-1, the policy table 220-1, the session table 230-1 and the IP fragmentation table 240-1.

The packet processing unit 201-1 is connected to the plurality of IF units 204-1-1~204-1-M and the switch unit 300 through the packet transmission path.

The session management unit 202-1 is connected to the packet processing unit 201-1, the routing processing unit 203-1, the routing table 210-1, the policy table 220-1, the session table 230-1 and the IP fragmentation table 240-1 through the control signal line.

The routing processing unit 203-1 is connected to the routing table 210-1 through the control signal line.

Figure 3:
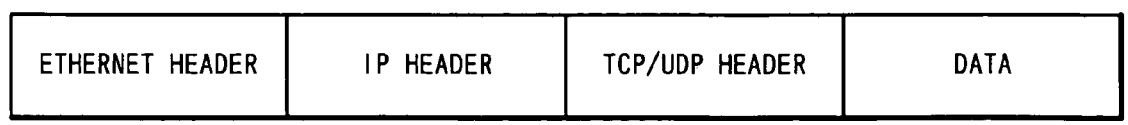
FIG. 3 is a diagram showing a structure of a packet from an external network.

The packet processing unit 201-1 receives a packet shown in FIG. 3 (including an Ethernet (registered trademark) header, an IP header, a TCP/UDP header and data) which is applied through the IF units 204-1-1~204-1-M to execute input side packet transfer processing shown in FIG. 4 which will be described later. At this time, session processing packet information having such a form as shown in FIG. 16 which will be described later is generated based on information extracted from a field designated in advance in the packet and transferred to the session management unit 202-1. The packet processing unit 201-1 receives a packet input from other network processing unit through the switch unit 300 to execute output side packet transfer processing shown in FIG. 8 which will be described later.

The session management unit 202-1 generates various kinds of search keys from the session processing packet information to execute search of the session table 230-1, the IP fragmentation table 240-1 and the policy table 220-1. Also execute new entry addition and deletion processing to/from the session table 230-1 and the IP fragmentation table 240-1. Moreover, generate information (session processing operation information etc.) necessary for executing new entry addition and deletion processing to/from the session tables 230-2~230-N in other network processing units 200-2~200-N.

The routing processing unit 203-1 receives a search key for the routing table 210-1 from the session management unit 202-1 to execute search of the routing table 210-1. Notify the search result to the session management unit 202-1.

The session tables 230-1~230-N are tables in which a session established by a packet relayed by the present packet relay device 1 is registered.

The policy table master 120 and the policy tables 220-1~220-N are tables in which packet passing rules relayed by the present packet relay device 1 are recited.

The IP fragmentation tables 240-1~240-N are tables for managing a policy and a session for a packet relayed by the present packet relay device 1 which is fragmented into an IP packet at the time when policy and session management determination is made using information of a layer higher than an IP layer.

The routing table master 110 and the routing tables 210-1~210-N are tables which manage an output destination IF unit of a packet relayed by the present packet relay device 1.

While the policy table master 120, the policy tables 220-1~220-N, the routing table master 110 and the routing tables 210-1~210-N are set by a manager of the present packet relay device 1 or by information in a packet of a routing protocol, with respect to the session tables 230-1~230-N and the IP fragmentation tables 240-1~240-N, determination whether processing of adding, updating and deleting session information to/from the table is made at each packet arrival.

The switch unit 300 is connected to the plurality of network processing units 200-1~200-N and the server 100 through the packet transmission path. Processing of packet transfer between the plurality of network processing units 200-1 and 200-N and processing of packet transfer between an external network and the server (transfer processing of a packet of a routing protocol etc.) are executed.

FIG. 10, FIG. 11 and FIG. 12 show structure examples of the session tables. The session table is formed of a session ID, a transmission source IP address, a transmission source port number, a protocol, a destination IP address, a destination port number, a transmission source session state, an input physical IF number and an output physical IF number. Among these items, the transmission source IP address, the transmission source port number, the protocol, the destination IP address and the destination port number will be search keys and the transmission source session state, the input physical IF number and the output physical IF number will be search results.

Search method is finding complete coincidence with a search key. Packet belonging to a session entry registered in the session table will be allowed to pass and a packet not hit by the table search will be abandoned.

FIG. 10, FIG. 11 and FIG. 12 show session tables in three network processing units as an example. Shown in FIG. 10 is the session table 230-1 in the network processing unit 200-1, shown in FIG. 11 is the session table 230-2 in the network processing unit 200-2 and shown in FIG. 12 is the session table 230-3 in the network processing unit 200-3.

FIG. 10, FIG. 11 and FIG. 12 show how two sessions are registered. One is a TCP session having an IP address of 192.168.1.1 and the port number 1025 and having an IP address of 192.168.10.1 and the port number 80. The other is a TCP session having an IP address of 192.168.6.2 and the port number 12300 and having an IP address of 192.168.100.15 and the port number 80.

FIG. 10 shows registration of a TCP session whose session ID is 1-1 and which is from the IP address of 192.168.1.1 with the port number 1025 to the IP address of 192.168.10.1 with the port number 80 and registration of a TCP session whose session ID is 1-2 and which is from the IP address of 192.168.100.15 with the port number 80 to the IP address of 192.168.6.2 with the port number 12300. In addition, registered correlating with the session ID 1-1 are the transmission source session state of Establish, the input physical IF number 1-1 and the output physical IF number 2-1 and registered correlating with the session ID 1-2 are the transmission source session state of Establish, the input physical IF number 1-2 and the output physical IF number 3-2. When indicated as the physical IF number: J-K, the physical IF number represents the IF unit 204-J-K in the network processing unit 200-J.

FIG. 11 shows registration of a session whose session ID is 2-1. The present session entry is an entry whose registration contents are paired with those of the session ID 1-1 in FIG. 10.

Similarly, a session whose session ID is 3-1 shown in FIG. 12 is paired with the session ID 1-2 in FIG. 10.

FIG. 13 shows structure examples of the policy table master 120 and the policy tables 220-1~220-N.

The policy table master 120 and the policy tables 220-1~220-N are formed of an ACL-ID, a transmission source IP address, a transmission source port number, a protocol, a destination IP address, a destination port number and a policy. The policy is information indicative of packet passage and abandonment. Among these items, the transmission source IP address, the transmission source port number, the protocol, the destination IP address and the destination port number will be search keys and the policy will be a search result.

With higher priority assigned to an entry whose ACL-ID has a low number, the method of searching the policy table master 120 and the policy tables 220-1~220-N is searching entries in ascending order of ACL-IDs to consider an entry which first hits as a search result. Method of searching the present policy table master 120 and policy tables 220-1~220-N is not limited to this method but may have a rule that with lower priority assigned to an entry whose ACL-ID has a low number, search is conducted in ascending order of ACL-IDs to consider an entry which last hits as a search result.

FIG. 14 shows an example of a structure of the IP fragmentation tables 240-1~240-N. Shown in the figure is an example of the IP fragmentation table 240-1.

The IP fragmentation table 240-1 is formed of a fragment ID, a transmission source IP address, a destination IP address, a protocol, a fragment flag and a fragment offset, a policy, an input physical IF number and an output physical IF number. Among these items, the transmission source IP address, the destination IP address and the protocol will be search keys and the fragment flag and the fragment offset, the policy, the input physical IF number and the output physical IF number will be search results. Search method is finding complete coincidence with a search key.

FIG. 15 shows an example of a structure of the routing table master 110 and the routing tables 210-1~210-N.

The routing table master 110 and the routing tables 210-1~210-N are each formed of a routing ID, a destination IP address and an output physical IF number. Among these items, the destination IP address will be a search key and the output physical IF number will be a search result. Search method is finding coincidence with a search key in greatest length.

FIG. 16 shows an example of arrangement of session processing packet information.

The session processing packet information is formed of a packet ID, an input physical IF number, an IP header, a TCP/UDP header, session processing operation information, a policy and an output physical IF number.

The session processing packet information is information sent and received between the packet processing units 201-1~201-N and the session management units 202-1~202-N. Upon receiving a packet from an external network, the packet processing units 201-1~201-N set a packet ID which specifies the above packet, an input physical IF number indicative of an IF unit which has received the above packet, and an IP header and a TCP/UDP header of the above packet at relevant parts to generate session processing packet information with a default value set at the session processing operation information, the policy and the output physical IF number and hand over the same to the session management units 202-1~202-N. The session management units 202-1~202-N and the routing processing units 203-1~203-N execute search and determination processing based on the session processing packet information and the session management units 202-1~202-N set a value according to the search and determination processing result at the session processing operation information, the policy and the output physical IF number and return the session processing packet information with these information set to the packet processing units 201-1~201-N. The session processing operation information represents operation processing with respect to the session tables 230-1~230-N, which includes new session addition, session maintenance and session close.

FIG. 17 shows an example of arrangement of an expansion header in the device. As shown in the figure, the expansion header in the device is formed of session processing operation information, a policy, an input physical IF number and an output physical IF number. Thus arranged expansion header in the device is generated by the packet processing units 201-1~201-N and added to a received packet.

The packet processing unit 201-1, the session management unit 202-1, the routing processing unit 203-1 and the IF units 204-1-1~204-1-M which the network processing unit 200-1 has can be realized by hardware or by a program. When implementing the units by a program, a program for realizing the above-described respective units is recorded in a recording medium (disk, semiconductor memory, etc.) The program is read by the network processing unit 200-1 formed of a computer to control operation of the computer to realize the packet processing unit 201-1, the session management unit 202-1, the routing processing unit 203-1 and the IF units 204-1-1~204-1-M on the network processing unit 200-1.

Next, operation of the packet relay device 1 according to the embodiment of the present invention will be described with reference to the drawings.

Figure 2:
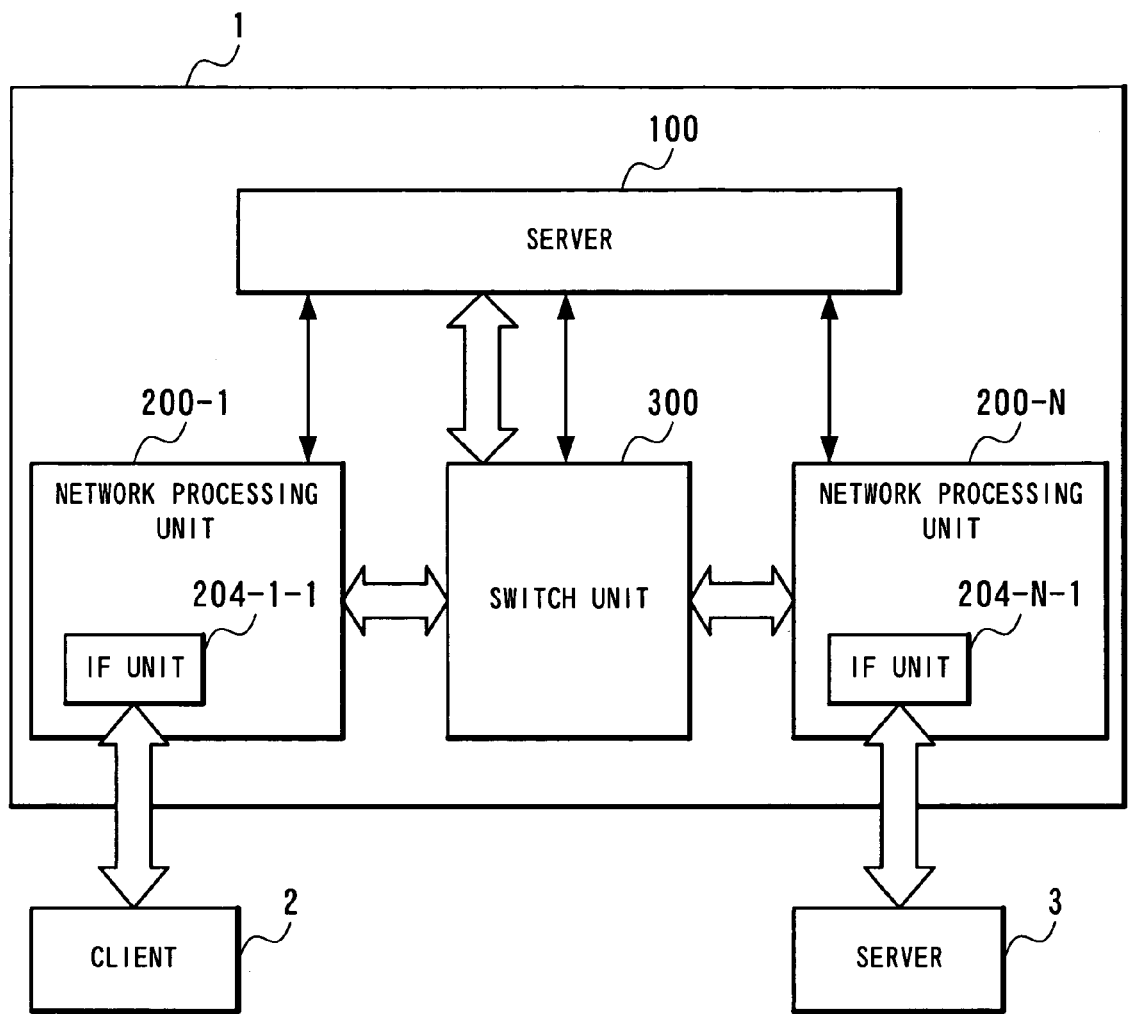
FIG. 2 is a diagram showing connection between a packet relay device 1, a client 2 and a server 3 according to the embodiment of the present invention.

FIG. 2 shows a connection relationship between the packet relay device 1 according to the embodiment of the present invention and a client 2 and a server 3.

The client 2 is connected to the IF unit 204-1-1 belonging to the network processing unit 200-1 of the packet relay device 1. The server 3 is connected to the IF unit 204-N-1 belonging to the network processing unit 200-N of the packet relay device 1. A packet shown in FIG. 3 which is transmitted from the client 2 is received by the IF unit 204-1-1 and a packet directed to the client 2 is conversely transmitted from the IF unit 204-1-1. A packet transmitted from the server 3 is received by the IF unit 204-N-1 and a packet directed to the server 3 is conversely transmitted from the IF unit 204-N-1.

In the following, description will be made of operation executed when a packet directed from the client 2 to the server 3 is transferred through the packet relay device 1 with reference to FIG. 1 and FIG. 2.

When a packet transmitted from the client 2 arrives at the IF unit 204-1-1, the network processing unit 200-1 executes input side packet transfer processing shown in FIG. 4 which will be described later.

After the input side packet transfer processing shown in FIG. 4 which will be described later is executed, the packet is transferred to the network processing unit 200-N through the switch unit 300.

The network processing unit 200-N executes output side packet transfer processing shown in FIG. 8 which will be described later to transmit the packet from the IF unit 204-N-1 to the server 3.

Next, the input side packet transfer processing will be described with reference to FIG. 4. FIG. 4 is a flow chart showing a processing flow of the input side packet transfer processing.

Upon receiving a packet from the IF unit 204-1-1 (Step 1), the packet processing unit 201-1 checks a check sum of the packet (Step 2) to start buffering of the packet (Step 3).

Then, the packet processing unit 201-1 generates session processing packet information having the form shown in FIG. 16 based on the contents of a field in the received packet (Step 4) and notifies the session management unit 202-1 of the session processing packet information to start session management unit processing at the session management unit 202-1 shown in FIG. 5 which will be described later (Step 5).

Until the session management unit 202-1 returns session processing packet information in which the search result is reflected, the packet processing unit 201-1 holds the packet. The held packet and the session processing packet information are correlated with each other by a packet ID in the session processing packet information. When the session management unit 202-1 returns session processing packet information with the search result reflected on session processing operation information, a policy and an output physical IF number to the packet processing unit 201-1, the packet processing unit 201-1 generates an expansion header in the device having a form shown in FIG. 17 from a search and determination result (the session processing operation information, the policy and the output physical IF number) in the session processing packet information and the IF number (input physical IF number) of the IF unit 204-1-1 having received the packet to apply the expansion header in the device to a relevant packet which is correlated with the above session processing packet information by the packet ID (processing of adding expansion header in the device: Step 6). The form of the expansion header in the device is not limited to a header and it may be classification information (descriptor) managed separately from a packet.

The packet processing unit 201-1 executes packet transfer processing shown in FIG. 7 which will be described later based on the contents of the expansion header in the device (Step 7) to output the packet to the outside of the packet processing unit 201-1.

Figure 4:
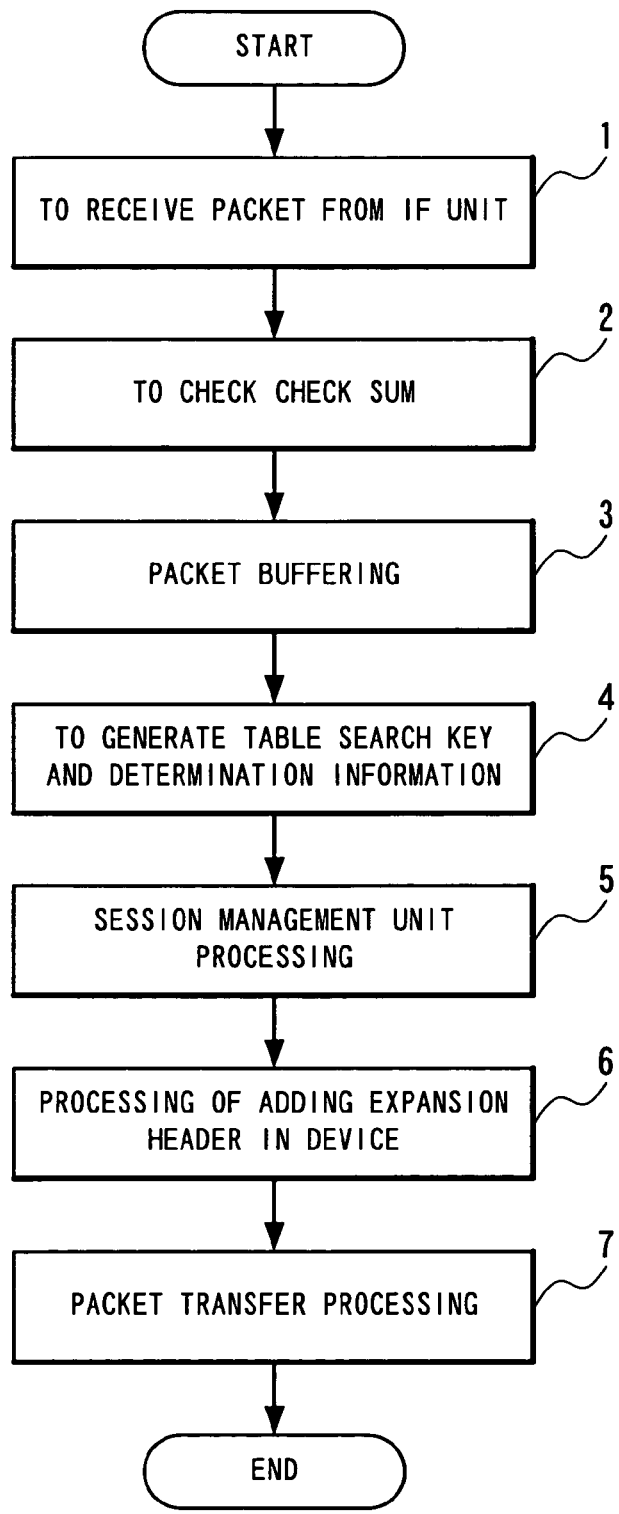
FIG. 4 is a flow chart showing a processing flow of input side packet transfer processing.
Figure 5:
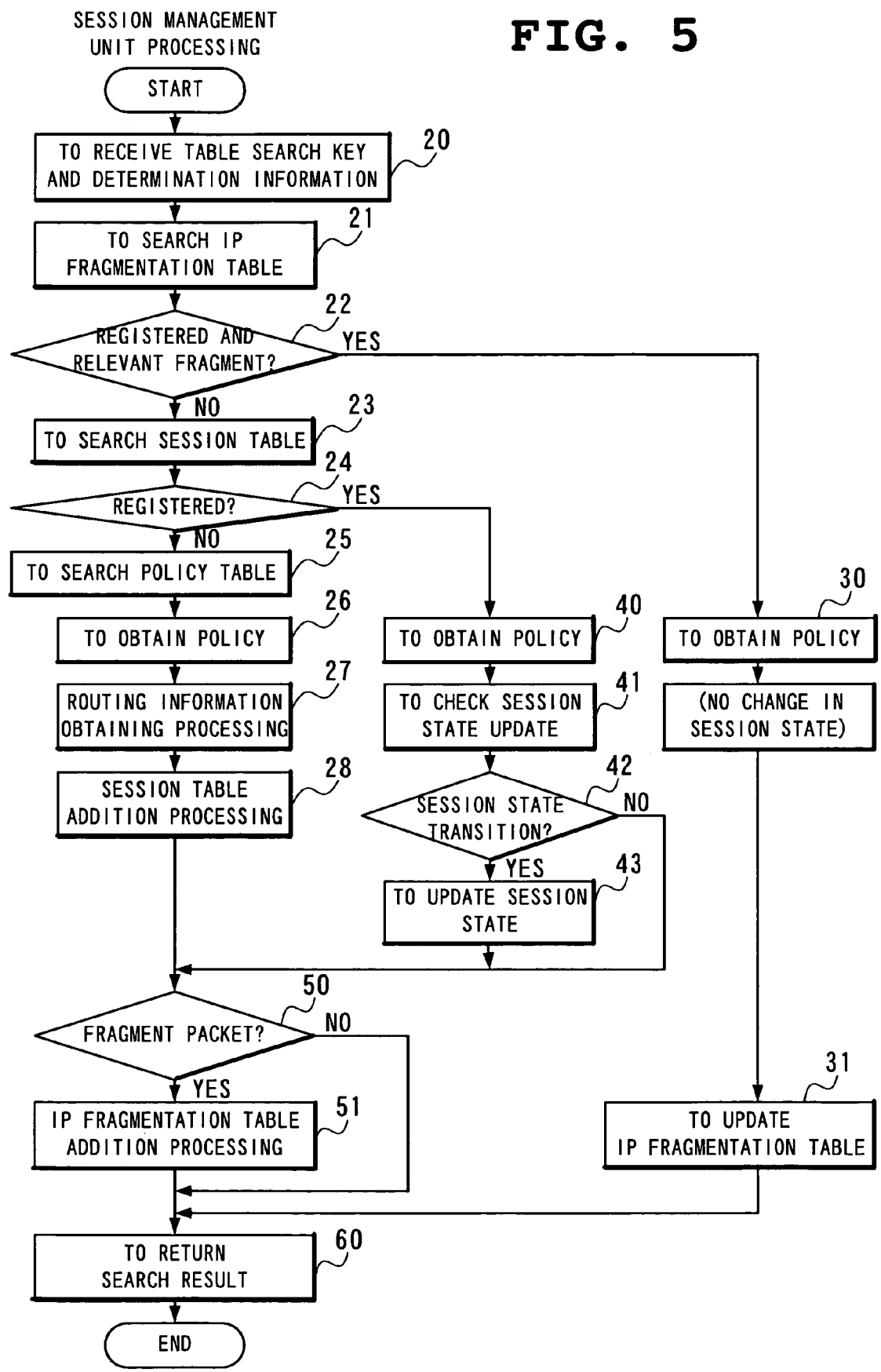
FIG. 5 is a flow chart showing a processing flow of session management unit processing executed at a session management unit 202-1 and a routing processing unit 203-1.

FIG. 5 is a flow chart showing a detailed processing flow of session management unit processing at the session management unit 202-1 and the routing processing unit 203-1 which is executed at Step 5 in FIG. 4.

First, the session management unit 202-1 receives session processing packet information from the packet processing unit 201-1 to generate a search key for each table and determination information (Step 20). For the session table, for example, a search key is generated including a transmission source IP address, a transmission source port number, a protocol, a destination IP address and a destination port number based on an IP header in the session processing packet information. For the IP fragmentation table, for example, generate a search key including a transmission source IP address, a protocol and a destination IP address based on the IP header in the session processing packet information, as well as generating determination information including a fragment offset.

Next, the session management unit 202-1 executes search of the IP fragmentation table 240-1 (Step 21).

When a packet to be searched is a fragment IP packet, the IP fragmentation table 240-1 has its fragment registration and an offset value (determination information) of the target packet coincides with a predicted offset value recited in the IP fragmentation table 240-1, determine that the packet is a successive fragment as an IP fragment (Step 22-Yes). At this time, the session management unit 202-1 obtains a policy of a session to which the packet belongs and an output physical IF number which specifies an IF unit to be an output destination of the packet from the IP fragmentation table 240-1 (Step 30). When obtaining the policy from the IP fragmentation table 240-1, no update is made of a session state because TCP and UDP layers have data succeeding.

Subsequent to Step 30, calculate (predict) a fragment offset value of a subsequent packet from a fragment offset value and a packet length of the target packet to update a fragment offset value of the relevant entry of the IP fragmentation table 240-1. In a case where the target packet is a last fragment, delete the entry (Step 31) and thereafter proceed to Step 60.

When determining that the packet is not a successive fragment as an IP fragment (Step 22-No), execute search of the session table 230-1 (Step 23).

When there exists, in the session table 230-1, an entry coinciding with the search key for the session table which is generated at Step 20 (Step 24-Yes), determination is made that the IP packet is a packet belonging to a registered session. Thereafter, the session management unit 202-1 obtains the policy of the IP packet being "packet passing", as well as obtaining a transmission source session state and an output physical IF number from the session table 230-1 (Step 40). Here, the reason why the policy "packet passing" is obtained is that registered in the session table 230-1 is only information related to a session whose policy is "packet passing".

Subsequently to Step 40, in a case of a TCP packet, execute session state update check (Step 41). Based on an SYN/ACK/FIN flag of a TCP header and the transmission source session state obtained from the session table 230-1, determination is made of a new session state of the transmission source.

When the determined new session state changes from a session state of the relevant entry in the session table 230-1 (Step 42-Yes), update the session state of the entry in the session table 230-1 to the determined new session state. When determining that the session is closed, delete the entry (Step 43). Thereafter, proceed to Step 50.

In a case where the determined new session state has no change from the transmission source session state obtained from the session table 230-1 (Step 42-No), execute no update of the session table 230-1 to proceed to Step 50.

When no relevant entry exists in the session table 230-1 (Step 24-No), the session management unit 202-1 searches the policy table 220-1 for a policy of the IP packet (Step 25). Search of the policy table 220-1 obtains a policy of the relevant packet without fail (Step 26). Even when it fails to exist in the entry, deciding a default policy will do.

When the policy obtained at Step 26 is "packet passing", execute processing of Step 28 after executing routing information obtaining processing shown in FIG. 6 which will be described later (Step 27).

At Step 28, make determination of a session state of the transmission source from the SYN/ACK/FIN flag of the TCP header and when determining that it is session opening, add a new session entry to the session table 230-1. In session entry addition to the session table 230-1, register a transmission source IP address, a transmission source port number, a protocol, a destination IP address, a destination port number, a transmission source session state, an input physical IF number and an output physical IF number of the input packet as they are. In a case where comparison between the output physical IF number and the input physical IF number finds that a packet transfer destination is an IF unit in the same network processing unit, in addition to the above entry addition, register an entry with the transmission source IP address, the transmission source port number, the input physical IF number, the destination IP address, the destination port number and the output physical IF number of the input packet replaced. This is because an entry related to a packet flow reverse to that of the present packet needs to be registered in the session table 203-1. In other case than the session opening, determine that the packet needs no session management to refrain from executing session entry addition to the session table 230-1. Thereafter, the processing of the session management unit 202-1 proceeds to Step 50.

On the other hand, when the policy obtained at Step 26 is "packet abandonment", the processing of the session management unit 202-1 skips Step 27 and Step 28 to proceed to Step 50.

Subsequently to Step 28, Step 42-No, Step 43 and Step 26 (in a case where the policy is "packet abandonment"), make determination whether the packet is a fragment IP packet (Step 50).

When the packet is a fragment IP packet (Step 50-Yes), execute entry addition to the IP fragmentation table 240-1 (Step 51) to proceed to Step 60.

On the other hand, when the packet is not a fragment IP packet (Step 50-No), proceed to Step 60.

Lastly, set the information obtained related to the packet to the session processing operation information (new session addition/session maintenance/session closing), the policy (passing/abandonment) and the output physical IF number in the session processing packet information having a form shown in FIG. 16 and return the obtained information to the packet processing unit 201-1 (Step 60). The foregoing processing ends the flow shown in FIG. 5.

Figure 6:
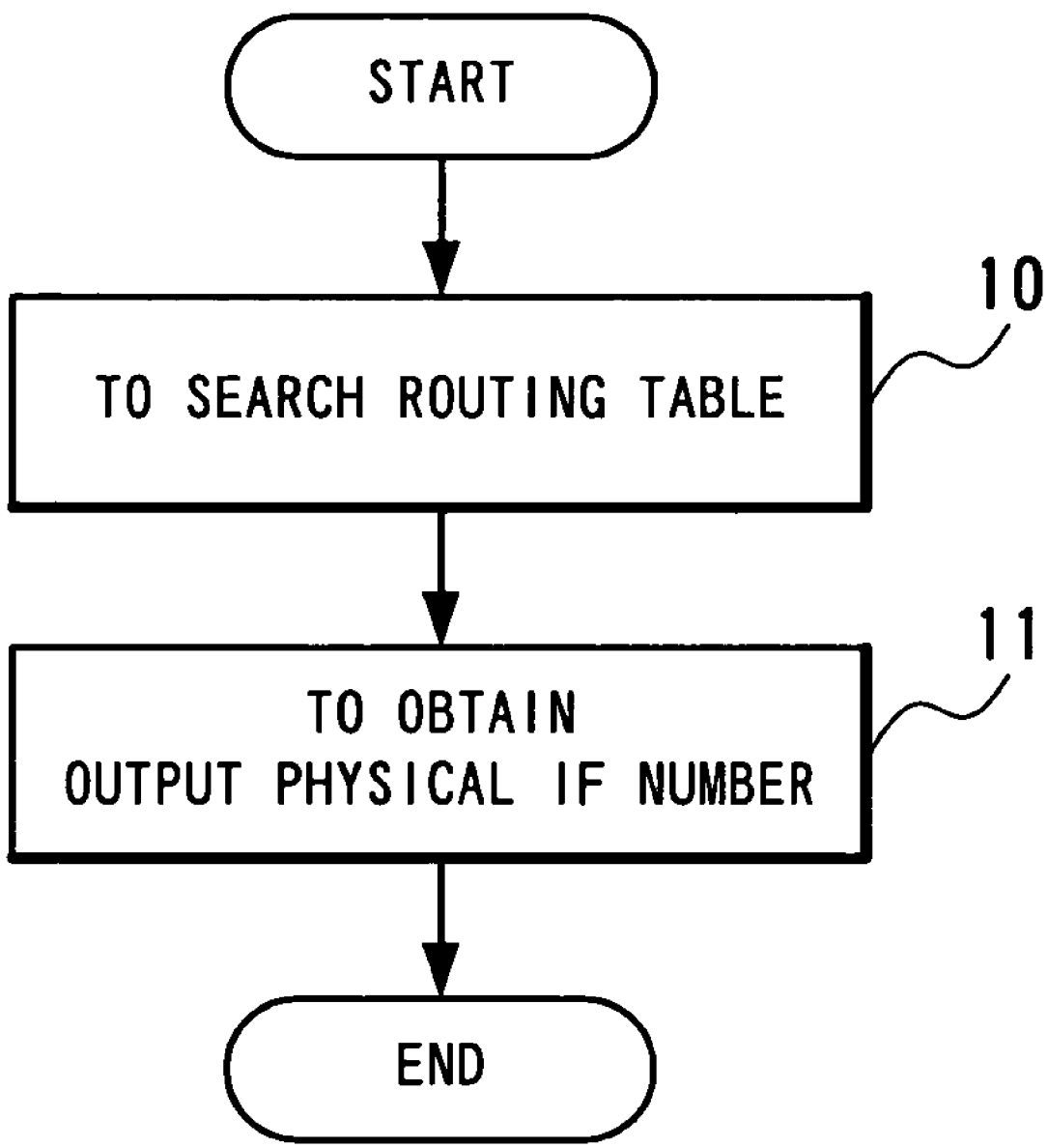
FIG. 6 is a flow chart showing a processing flow of routing information obtaining processing.

FIG. 6 is a flow chart showing a detailed processing flow of the routing information obtaining processing executed at Step 27 in FIG. 5. The processing is executed by the routing processing unit 203-1. In the routing information obtaining processing, search the routing table 210-1 (Step 10) and obtain the output physical IF number (Step 11) to end.

Figure 7:
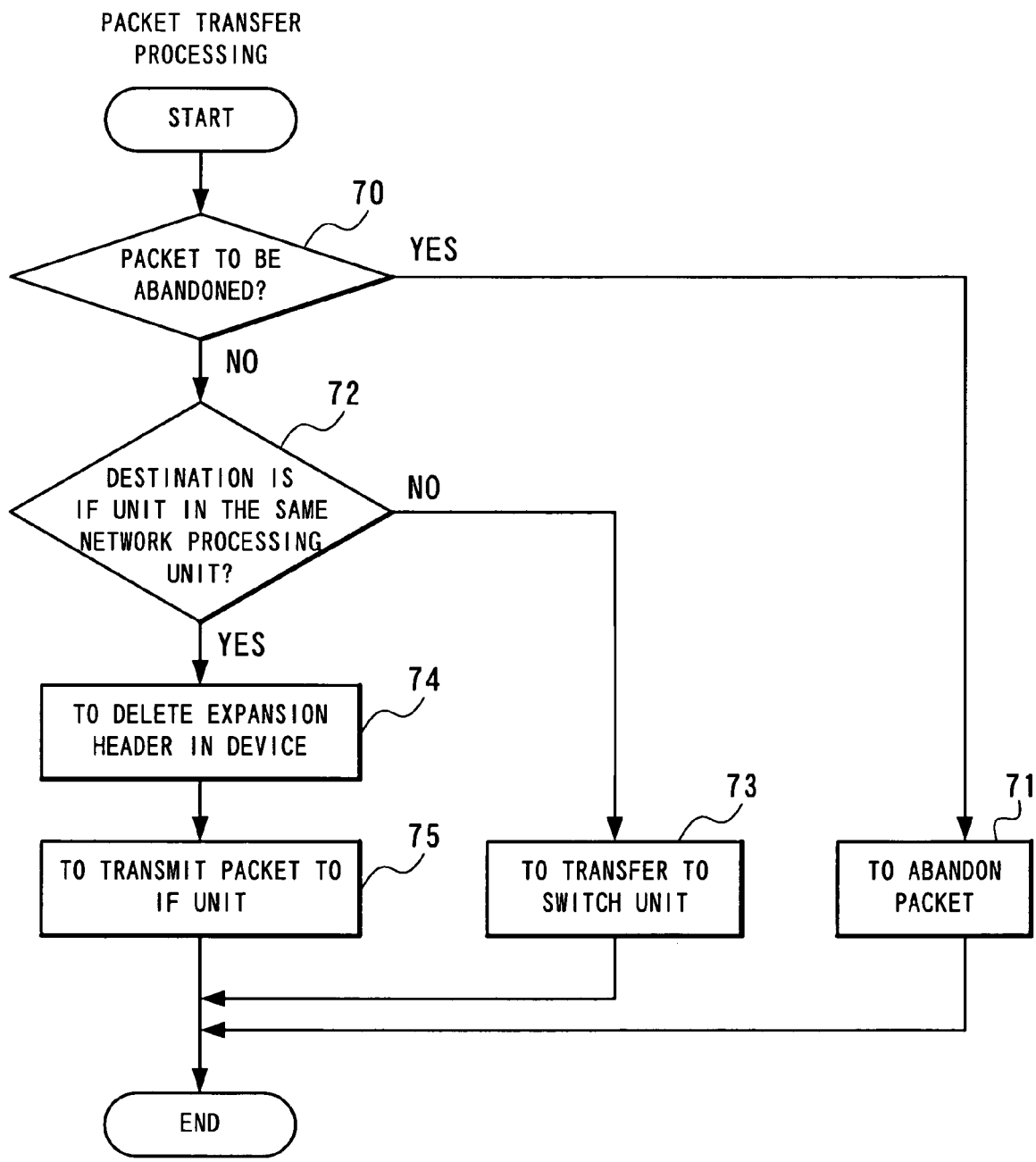
FIG. 7 is a flow chart showing a processing flow of packet transfer processing.

FIG. 7 is a flow chart showing a detailed processing flow of the packet transfer processing executed at Step 7 in FIG. 4. The packet processing unit 201-1 determines whether a relevant packet is to be abandoned or not with reference to the policy in the expansion header in the device (Step 70). When the packet is to be abandoned (Step 70-Yes), abandon the packet (Step 71).

When the packet is not to be abandoned (Step 70-No), determine whether a transfer destination of the packet is the IF unit in the same network processing unit 200-1 or an IF unit in other network processing unit with reference to the output physical IF number in the expansion header in the device (Step 72). In a case where the packet transfer destination is an IF unit in other network processing unit (Step 72-No), transfer the packet to the switch unit 300 (Step 73). At this time, transfer the packet with the expansion header in the device applied. The switch unit 300 transfers the packet with the expansion header in the device applied to the network processing unit (in a case of this example, to the network processing unit 200-N) having an IF unit specified by the output physical IF number in the expansion header in the device.

When the transfer destination of the packet is the IF unit 204-1 in the same network processing unit 200-1 (Step 72-Yes), delete the expansion header in the device from the packet (Step 74) to output the packet to an IF unit specified by the output physical IF number in the expansion header in the device (Step 75).

Next, description will be made of output side packet transfer processing with respect to a packet arriving at the network processing unit 200-N through the switch unit 300 with reference to FIG. 8. FIG. 8 is a flow chart showing a processing flow of the output side packet transfer processing.

Upon receiving a packet from the network processing unit 200-1 through the switch unit 300 (Step 101), the packet processing unit 201-N checks an expansion header in the device attached to the packet (Step 102) to start buffering of the packet (Step 103). Then, the packet processing unit 201-N executes session table processing at the session management unit 202-N shown in FIG. 9 which will be described later (Step 104). Until Step 104 is completed, the packet processing unit 201-N holds the packet. After the completion of Step 104, execute the packet transfer processing shown in FIG. 7 which has been described above based on the contents of the expansion header in the device (Step 105) and output the packet to the outside of the packet processing unit 201-N to end.

Figure 8:
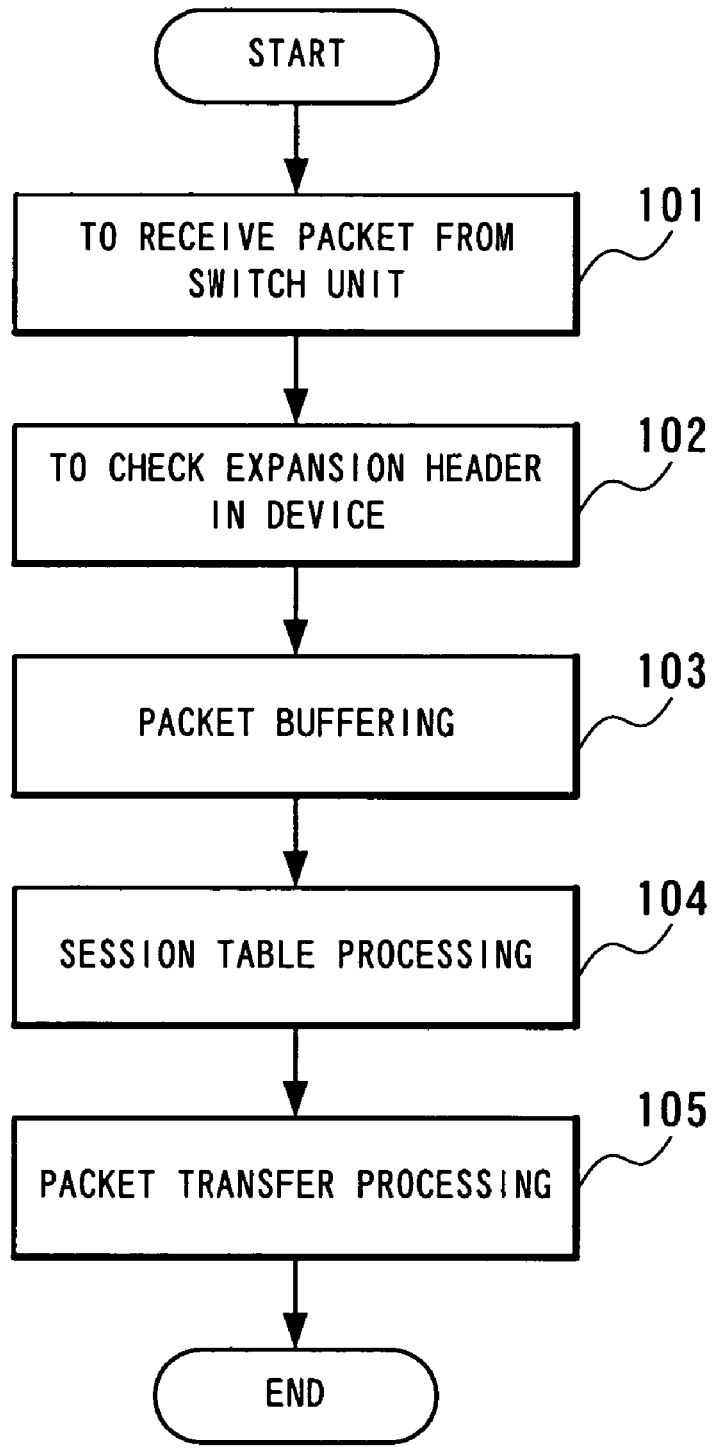
FIG. 8 is a flow chart showing a processing flow of output side packet transfer processing.
Figure 9:
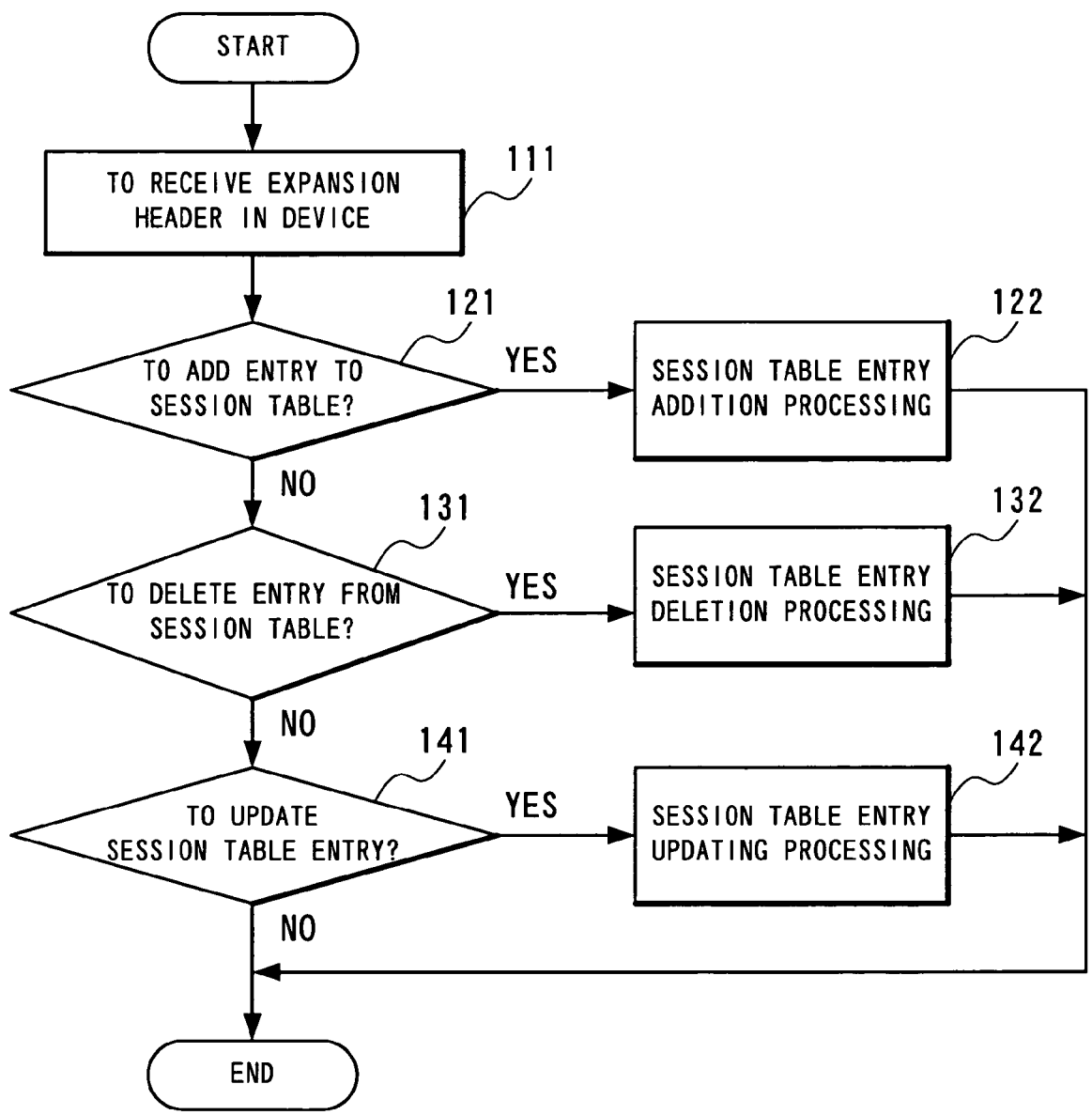
FIG. 9 is a flow chart showing a processing flow of session table processing in the session management unit 202-1.

FIG. 9 is a flow chart showing a detailed processing flow of the session table processing at the session management unit 202-1 executed at Step 104 in FIG. 8.

The session management unit 202-N receives an IP header, a TCP header and an expansion header in the device from the packet processing unit 201-N (Step 111) to determine whether session processing operation information in the expansion header in the device relates to new session entry addition or not (Step 121).

When the session processing operation information in the expansion header in the device relates to new session entry addition (Step 121-Yes), add a new session entry to the session table 230-N (Step 122). At the session entry addition to the session table 203-N, register an input packet with a transmission source IP address, a transmission source port number, an input physical IF number, a destination IP address, a destination port number and an output physical IF number replaced. This is because the session entry to the session table 203-N should be generated as an entry related to a packet flow reverse to that of the present packet.

When the session processing operation information in the expansion header in the device fails to relate to the new session entry addition (Step 121-No), determine whether the session processing operation information in the expansion header in the device relates to session entry deletion or not (Step 131).

When the session processing operation information in the expansion header in the device relates to the session entry deletion (Step 131-Yes), delete a relevant session entry in the session table 230-N (Step 132).

When the session processing operation information in the expansion header in the device fails to relate to the session entry deletion (Step 131-No), determine whether the session processing operation information in the expansion header in the device relates to session entry update (Step 141).

When the session processing operation information in the expansion header in the device relates to the session entry update (Step 141-Yes), update a relevant session entry in the session table 230-N (Step 142).

The processing flow of the packet transfer processing (Step 105) in FIG. 8 has the same contents as those in FIG. 7 described above. In the output side packet transfer processing, it is already found that a packet is output to an external network from any of the IF units in the network processing unit 200-N. Accordingly, in the flow shown in FIG. 7, (Step 70-No)→(Step 72-Yes)→(Step 74)→(Step 75) is selected.

As an example, operation executed when a TCP session is opened from the client 2 to the server 3 will be described.

Figure 18:
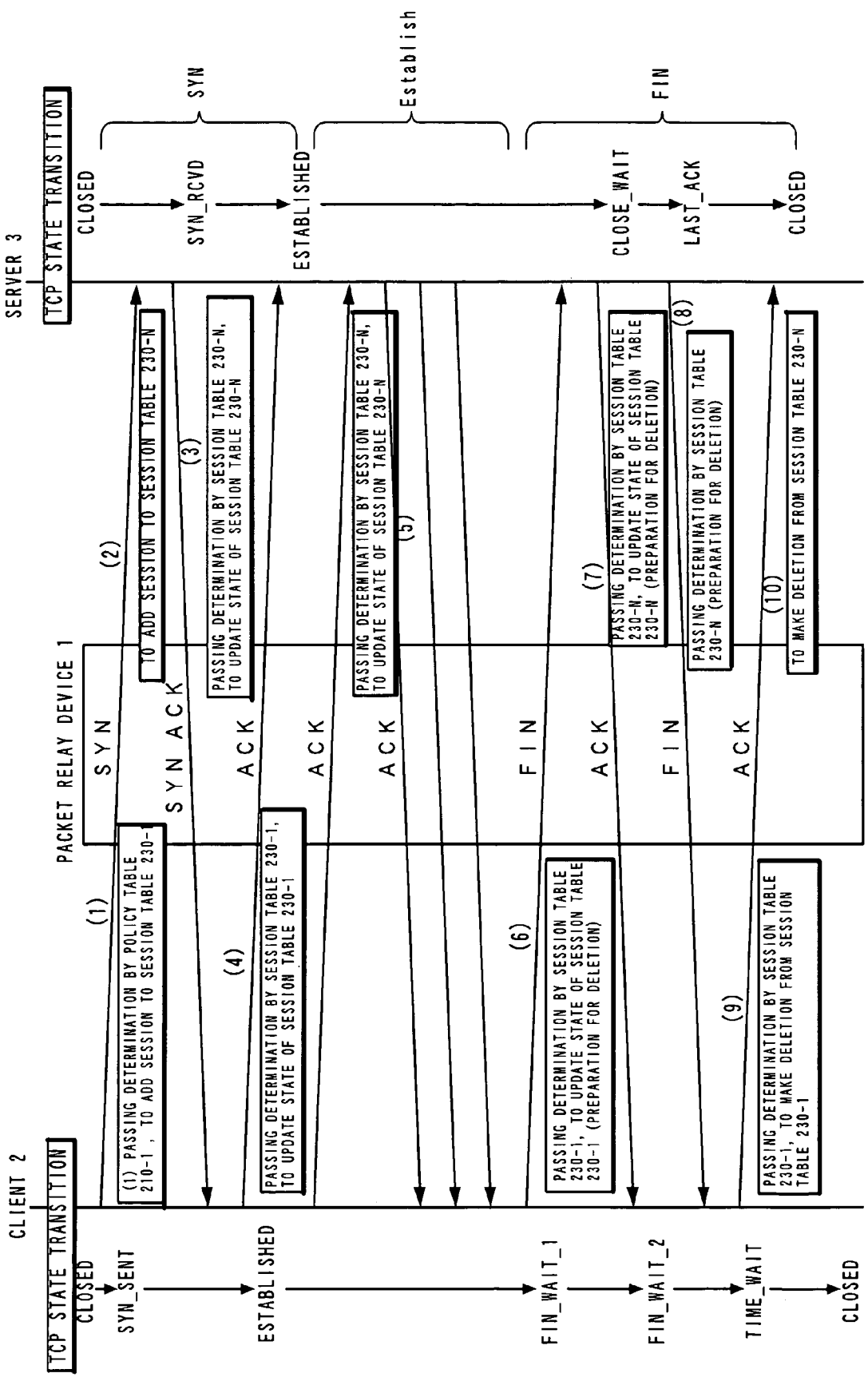
FIG. 18 is a diagram showing internal operation of the packet relay device 1 according to the embodiment of the present invention.
Figure 19:
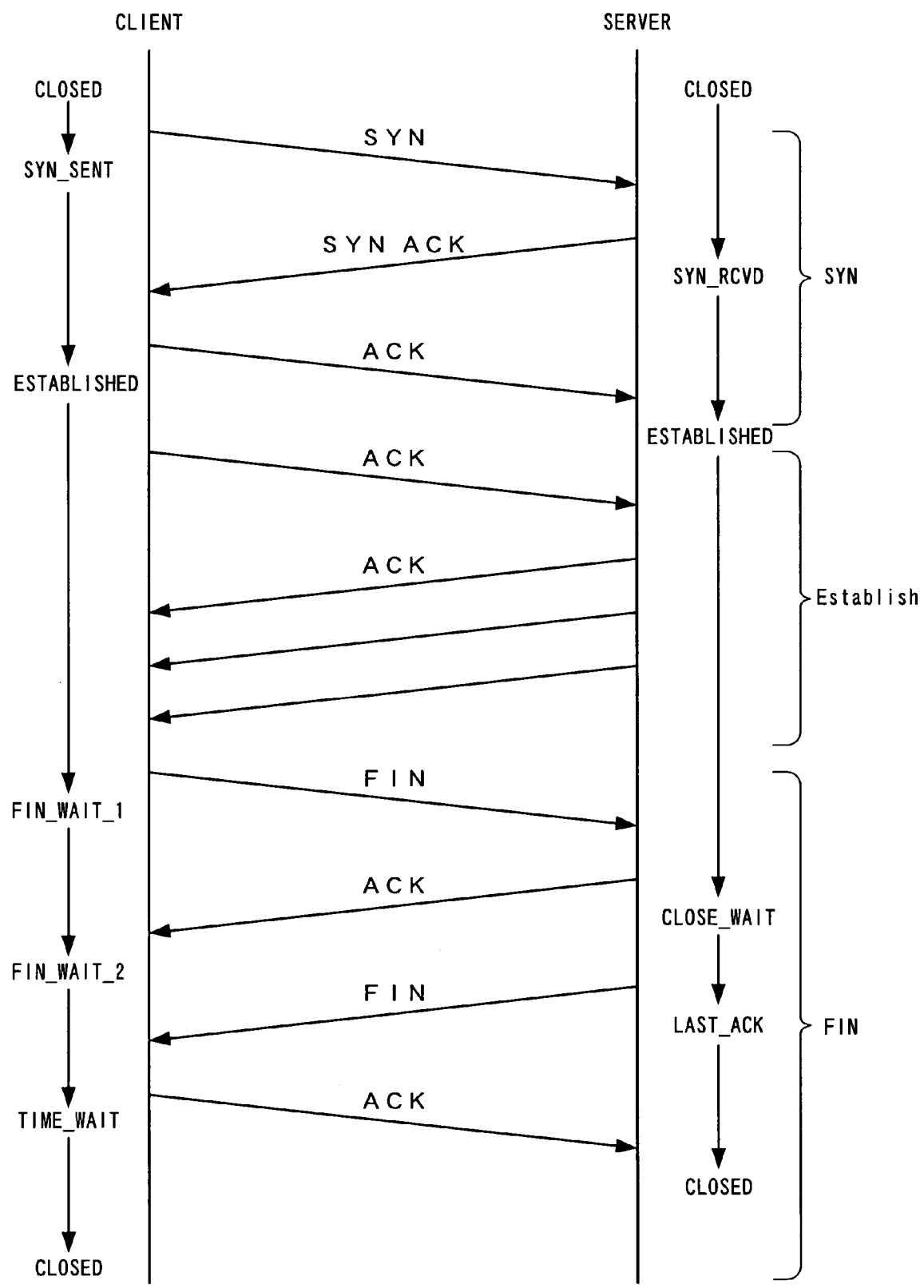
FIG. 19 is a diagram showing one example of state transition from opening to closing of a TCP session.
Figure 20:
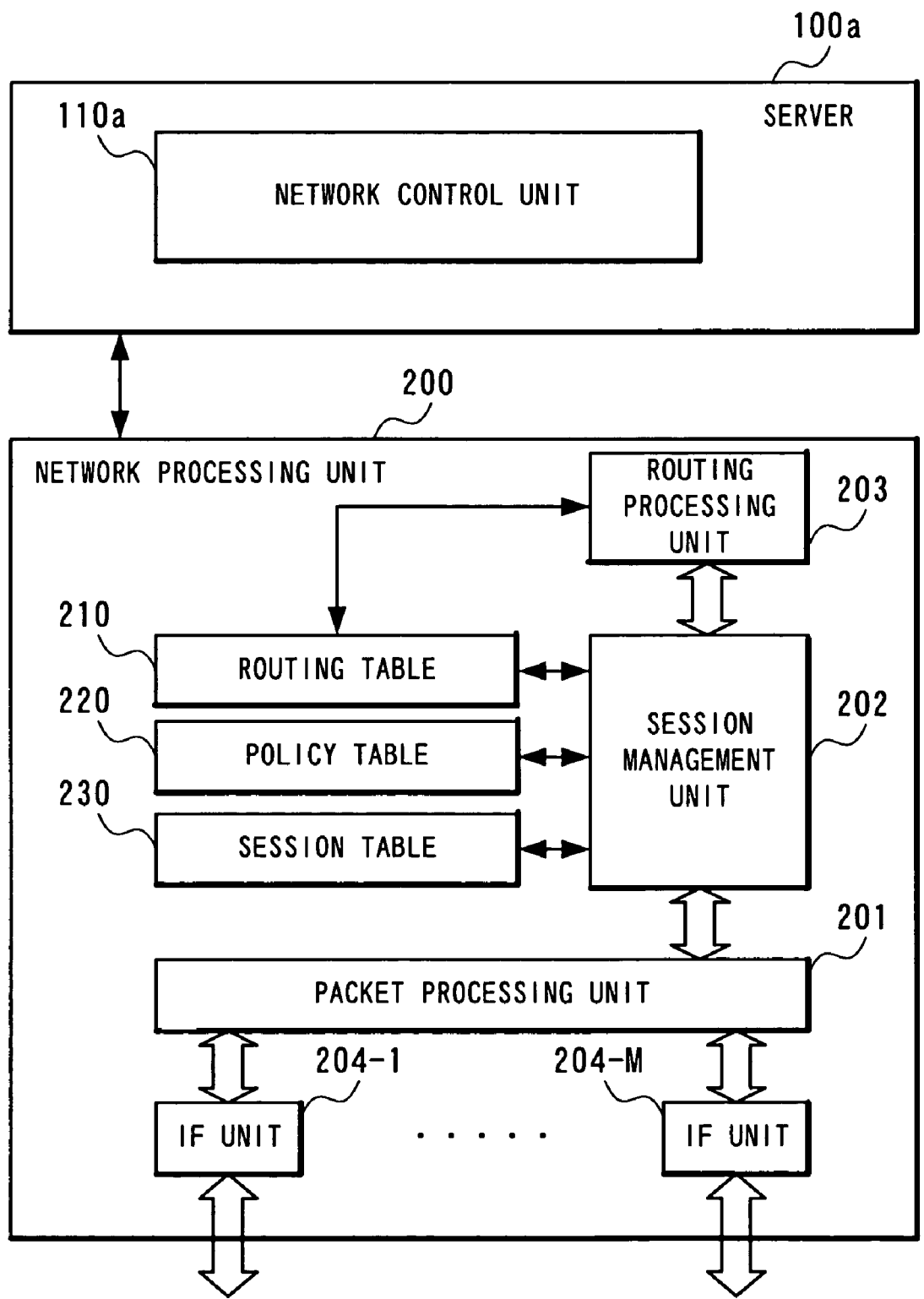
FIG. 20 is a diagram showing a structure of a conventional packet relay device.

FIG. 18 shows operation of the packet relay device executed when a TCP session is established from the client 2 to the server 3 in the embodiment of the present invention.

(Session Opening)

(1) The client 2→the packet relay device 1: to determine that a packet is allowed to pass by the policy recited in the SYN packet policy table 210-1 to add a new session to the session table 230-1.

(2) The packet relay device 1→the server 3: to add a new session to the SYN packet session table 230-N.

(3) The server 3→the packet relay device 1: to determine that the packet is allowed to pass by the SYN, ACK packet session table 230-N to update a state.

(4) The client 2→the packet relay device 1: to determine that the packet is allowed to pass by the ACK packet session table 230-1 to update the state.

(5) The server 3→the packet relay device 1: to determine that the packet is allowed to pass by the ACK packet session table 230-N to update the state.

(Session Closing)

(6) The client 2→the packet relay device 1: to determine that the packet is allowed to pass by the FIN packet session table 230-1. To update the state to prepare for session deletion.

(7) The server 3→the packet relay device 1: to determine that the packet is allowed to pass by the ACK packet session table 230-N. To update the state to prepare for session deletion.

(8) The server 3→the packet relay device 1: to determine that the packet is allowed to pass by the FIN packet session table 230-N (in preparation for session deletion).

(9) The client 2→the packet relay device 1: to determine that the packet is allowed to pass by the ACK packet session table 230-1. To update the state to delete the session.

(10) The packet relay device 1→the server 3: To delete the session from the ACK packet session table 230-N.

Although in the above-described embodiment, session management related to a TCP session has been described with respect to its realization means, determination of TCP session closing can be executed as time-out processing by a timer. This can be realized by, with an item of a time-out time set at the session tables in FIG. 10, FIG. 11 and FIG. 12 and at the IP fragmentation table in FIG. 14, adding time-out management processing at the session management units 202-1~202-N, the session tables 230-1~230-N and the IP fragmentation tables 240-1~240-N in FIG. 1. More specifically, it can be realized in the following manner. At the time of adding and registering a new entry to the session tables 230-1~230-N and the IP fragmentation tables 240-1~240-N, the session management units 202-1~202-N set a predetermined time-out value at the item of the time-out time of the new entry to be added and registered. The session management units 202-1~202-N execute processing of decrementing the time-out value set at each entry of the session tables 230-1~230-N and the IP fragmentation tables 240-1~240-N by a predetermined value at fixed time intervals. Then, delete an entry whose time-out value goes equal to or below a predetermined value.

Addition of this function enables TCP session registration to be automatically released even when a line of a client or a server who sets up the TCP session or a line connecting them breaks down to prevent a TCP session closing sequence from occurring. By the same manner, session management can be realized with respect to a UDP virtual session. Also in a case of a session by a URL or a Cookie in Web traffic, the same session management can be realized by extracting a URL or a Cookie included in a TCP packet as an identifier of the session.

As described in the foregoing, the packet relay device of the present invention enables improvement of session management capacity of the entire system because session management is dispersedly executed by a plurality of network processing units. In addition, session management capacity can be expanded on a network processing unit basis.

In addition, in the packet relay device of the present invention, executing processing of searching the session table, the policy table and the IP fragmentation table only once by a session management unit in a network processing unit which has received a packet from an external network prevents table searching processing from bottlenecking.

Moreover, in the packet relay device of the present invention, when a packet received from an external network is a packet of a new session, that is, when information related to a session to which the above packet belongs is yet to be registered in the session table, an input side network processing unit adds a session entry to the session table in its own processing unit, as well as transferring an addition instruction when transferring the packet to an output side network processing unit having an IF unit to be an output destination, and the output side network processing unit executes processing of adding the session entry to the session table in its own processing unit. This results in automatically equalizing the contents in the session tables in the respective network processing units to be a pair of an input and an output, thereby enabling equality of the session tables in different network processing units to be maintained without executing special session table copying processing.

Furthermore, provision of an IP fragmentation table enables the packet relay device of the present invention to realize session management for a fragment IP packet.

The invention claimed is:

1. A packet relay device which relays a packet, comprising a plurality of network processors, wherein on a condition that an interface (IF), as an output destination determined for a session to which a packet received from an external network, is associated with another network processor, the plurality of network processors each transmit said packet and IF specifying information which specifies said IF to said other network processor, wherein the packet comprises a fragment Internet Protocol (IP) packet, wherein each of the plurality of network processors includes an IP fragmentation table having an entry in which a fragment offset and a fragment IF specifying information of an IF to be an output destination of the fragment IP packet is registered that correlates with a transmission source IP address and a destination IP address of the fragment IP packet, wherein, when one of the plurality of network processors receives the fragment IP packet through an external network, the one of the plurality of network processors searches the IP fragmentation table, wherein, when there exists an entry in the IP fragmentation table in which a same transmission source IP address, destination IP address, and fragment offset as a transmission source IP address, a destination IP address, and a fragment offset of the fragment IP packet are registered, the one of the plurality of network processors obtains the IF specifying information in the entry, and updates the fragment offset in the entry, based on a packet length of the fragment IP packet, and wherein, when there exists no relevant entry in the IP fragmentation table, the one of the plurality of network processors searches for the IF specifying information of an IF to be an output destination of the fragment IP packet, registers the searched IF specifying information, and adds a new entry including the transmission source IP address, the destination IP address, and the fragment offset in the fragment IP packet.

2. The packet relay device as set forth in claim 1, wherein, when receiving a packet and IF specifying information from the other network processor, each of said network processors outputs said packet to the IF specified by said IF specifying information.

3. The packet relay device as set forth in claim 1, wherein one the plurality of network processors, when receiving a packet for closing a session from either the external network or another of the plurality of network processors, deletes information related to a session to which the packet belongs from a session table.

4. A packet relay device which relays a packet, comprising:
a plurality of network processors; and
a switch which connects the plurality of network processors with each other,
wherein said plurality of network processors each, when receiving a packet from an external network, on a condition that an interface (IF), as an output destination determined for a session to which the packet belongs, is associated with another network processor, inputs said packet and IF specifying information which specifies said IF to said switch, and said switch transfers the input packet and IF specifying information to the network processor having the IF specified by the IF specifying information,
wherein the packet comprises a fragment Internet Protocol (IP) packet,
wherein each of the plurality of network processors includes an IP fragmentation table having an entry in which a fragment offset and a fragment IF specifying information of an IF to be an output destination of the fragment IP packet is registered that correlates with a transmission source IP address and a destination IP address of the fragment IP packet,
wherein, when one of the plurality of network processors receives the fragment IP packet through an external network, the one of the plurality of network processors searches the IP fragmentation table, wherein, when there exists an entry in the IP fragmentation table in which the same transmission source IP address, destination IP address, and fragment offset as a transmission source IP address, a destination IP address, and a fragment offset of the fragment IP packet are registered, the one of the plurality of network processors obtains the IF specifying information in the entry and updates the fragment offset in the entry, based on a packet length of the fragment IP packet, and wherein, when there exists no relevant entry in the IP fragmentation table, the one of the plurality of network processors searches for the IF specifying information of an IF to be an output destination of the fragment IP packet, registers the searched IF specifying information, and adds a new entry including the transmission source IP address, the destination IP address, and the fragment offset in the fragment IP packet.

5. The packet relay device as set forth in claim 4, wherein, when receiving a packet and IF specifying information through said switch, each of said network processors outputs said packet to an IF specified by said IF specifying information.

6. The packet relay device as set forth in claim 5, wherein said plurality of network processors each comprises:
a session table in which, registered correlating with session specifying information which specifies a session, is IF specifying information of an IF to be an output destination of a packet belonging to the session; a session management unit which, when receiving a packet from said external network, searches said session table for IF specifying information of an IF to be an output destination of the packet; and
packet processing instructions embodied on a non-transitory computer readable medium, which when executed by the network processor form a packet processing unit which, when IF specifying information of an IF to be an output destination of said packet searched by the session management unit from said session table indicates an IF existing in another network processor, inputs said packet and said IF specifying information to said switch and, when a packet and IF specifying information are sent from another network processor through said switch, outputs said packet to an IF specified by said IF specifying information.

7. The packet relay device as set forth in claim 4, wherein said plurality of network processors each comprises:
a session table in which registered correlating with session specifying information which specifies a session, is IF specifying information of an IF to be an output destination of a packet belonging to the session;
session management instructions embodied on a non-transitory computer readable medium, which when executed by the network processor form a session management unit, which, when receiving a packet from said external network, searches said session table for IF specifying information of an IF to be an output destination of the packet; and
packet processing instructions embodied on a non-transitory computer readable medium, which when executed by the network processor form a packet processing unit, which, when IF specifying information of an IF to be an output destination of said packet searched by the session management unit from said session table indicates an IF associated with another network processor, inputs said packet and said IF specifying information to said switch and, when a packet and IF specifying information are sent from another network processor through said switch, outputs said packet to an IF specified by said IF specifying information.

8. The packet relay device as set forth in claim 7, wherein each said network processor includes a routing table in which, registered correlating with a destination IP address of a packet, is IF specifying information of an IF to be an output destination of the packet,
wherein said session management unit, when failing to find IF specifying information of an IF to be an output destination of said packet in said session table, searches said routing table for the IF specifying information of the IF to be an output destination of said packet and registers, in said session table, the searched IF specifying information and session specifying information of a session to which said packet belongs, so as to correlate the searched IF specifying information and session specifying information with each other, and when a packet, IF specifying information, and an addition instruction are received through said switch, registers, in said session table, IF specifying information included in said addition instruction as IF specifying information indicative of an IF as an output destination, as well as registering session specifying information of a session to which said packet belongs, so as to correlate with the IF specifying information, wherein said packet processing unit, when the IF specifying information of the IF to be an output destination of said packet which is searched by said session management unit from said routing table indicates, an IF existing in another network processor, applies said packet, said IF specifying information, and an addition instruction including IF specifying information of an IF which has received said packet to said switch, and wherein said switch transfers the applied packet, IF specifying information, and addition instruction to the network processor having an IF specified by said IF specifying information.

9. The packet relay device as set forth in claim 8, wherein each said plurality of network processors includes a policy table in which is registered, correlating with session specifying information which specifies a session, a policy of the session, and wherein said session management unit, when failing to find IF specifying information of an IF to be an output destination of said packet in said session table, on condition that a policy of a session to which said packet belongs that is registered in said policy table allows packet passage, searches said routing table for the IF specifying information of the IF to be an output destination of said packet and registers, in said session table, the searched IF specifying information and session specifying information of a session to which said packet belongs, so as to correlate the searched IF specifying information and session specifying information with each other, and when a packet, IF specifying information, and an addition instruction are received through said switch, registers, in said session table, IF specifying information included in said addition instruction as IF specifying information indicative of an IF as an output destination, as well as registering session specifying information of a session to which said packet belongs so as to correlate with the IF specifying information.

10. The packet relay device as set forth in claim 8, wherein said session management unit, when registering a pair of session specifying information and IF specifying information at said session table, also registers a predetermined time-out value, as well as decrementing each time-out value registered in the session table by a fixed value at predetermined time intervals, to delete an entry whose decremented time-out value goes equal to or below a predetermined value.

11. The packet relay device as set forth in claim 4, wherein one the plurality of network processors, when receiving a packet for closing a session from either the external network or the switch, deletes information related to a session to which the packet belongs from a session table.

12. A packet relay device which relays a packet, comprising:

a plurality of network processors; and a switch which connects the plurality of network processors with each other, wherein said plurality of network processors each, when receiving a packet from an external network, on a condition that an interface (IF) as an output destination determined for a session to which the packet belongs exists in another network processor, inputs said packet and IF specifying information, which specifies said IF to said switch, and wherein said switch transfers input packet and IF specifying information to the network processor having an IF specified by the IF specifying information, wherein said plurality of network processors each further include:

a session table in which registered, correlating with session specifying information which specifies a session, is IF specifying information of an IF to be an output destination of a packet belonging to the session;

session management instructions embodied on a non-transitory computer readable medium, which when executed by the network processor form a session management unit which, when receiving a packet from said external network, searches said session table for IF specifying information of an IF to be an output destination of the packet; and packet processing instructions embodied on a non-transitory computer readable medium, which when executed by the network processor form a packet processing unit which, when IF specifying information of an IF to be an output destination of said packet searched by the session management unit from said session table indicates an IF existing in another network processor, inputs said packet and said IF specifying information to said switch and when a packet and IF specifying information are sent from another network processor through said switch, outputs said packet to an IF specified by said IF specifying information, a routing table in which, registered correlating with a destination Internet Protocol (IP) address of a packet, is IF specifying information of an IF to be an output destination of the packet, wherein said session management unit, when failing to find IF specifying information of an IF to be an output destination of said packet in said session table, searches said routing table for the IF specifying information of the IF to be an output destination of said packet and registers, in said session table, the searched IF specifying information and session specifying information of a session to which said packet belongs, so as to correlate the searched IF specifying information and session specifying information with each other, and when a packet, IF specifying information, and an addition instruction are received through said switch, registers, in said session table, IF specifying information included in said addition instruction as IF specifying information indicative of an IF as an output destination, as well as registering session specifying information of a session to which said packet belongs, so as to correlate with the IF specifying information, wherein said packet processing unit, when the IF specifying information of the IF to be an output destination of said packet which is searched by said session management unit from said routing table and indicates an IF existing in another network processor, applies said packet, said IF specifying information and an addition instruction including IF specifying information of an IF which has received said packet to said switch, wherein said switch transfers the applied packet, IF specifying information, and addition instruction to the network processor having an IF specified by said IF specifying information, wherein said session management unit, when receiving a packet which closes a session from said external network, deletes information related to a session to which said packet belongs from said session table and, when receiving input of a packet, IF specifying information, and a deletion instruction through said switch, deletes information related to a session to which said packet belongs from said session table, and wherein said packet processing unit, when an IF to be an output destination of a packet which closes said session exits in another network processing device, applies said packet, said IF specifying information of the IF to be an output destination of said packet, and a deletion instruction to said switch.

13. A packet relay device which relays a packet, comprising:

a plurality of network processors; and a switch which connects the plurality of network processors with each other, wherein said plurality of network processors each, when receiving a packet from an external network, on condition that an interface as an output destination determined for a session to which the packet belongs exists in other network processor, inputs said packet and IF specifying information which specifies said IF to said switch, and wherein said switch transfers input packet and IF specifying information to the network processor having an IF specified by the IF specifying information, wherein said plurality of network processors each comprises:

a session table in which, registered correlating with session specifying information which specifies a session is, IF specifying information of an IF to be an output destination of a packet belonging to the session;

session management instructions embodied on a non-transitory computer readable medium, which when executed by the network processor form a session management unit which, when receiving a packet from said external network, searches said session table for IF specifying information of an IF to be an output destination of the packet; and packet processing instructions embodied on a non-transitory computer readable medium, which when executed by the network processor form a packet processing unit which, when IF specifying information of an IF to be an output destination of said packet searched by the session management unit from said session table indicates an IF existing in other network processor, inputs said packet and said IF specifying information to said switch, and, when a packet and IF specifying information are sent from another network processor through said switch, outputs said packet to an IF specified by said IF specifying information, a routing table in which, registered correlating with a destination Internet Protocol (IP) address of a packet, is IF specifying information of an IF to be an output destination of the packet; and an IP fragmentation table having an entry in which, registered correlating with a transmission source IP address and a destination IP address of a packet, are a fragment offset and IF specifying information of an IF to be an output destination of the packet, and said session management unit, when receiving a fragment IP packet through an external network, searches said IP fragmentation table, when there exists an entry in which the same transmission source IP address, destination IP address and fragment offset as a transmission source IP address, a destination IP address, and a fragment offset of said fragment IP packet are registered, obtains IF specifying information in said entry, as well as updating the fragment offset in said entry based on a packet length of said fragment IP packet, and, when there exists no relevant entry in said IP fragmentation table, searches said session table or said routing table for IF specifying information of an IF to be an output destination of said fragment IP packet to add and register the searched IF specifying information and an entry including the transmission source IP address, the destination IP address, and the fragment offset in said fragment IP packet.

14. A packet relay device having a plurality of network processors, wherein the plurality of network processors each, when receiving a packet from an external network, on a condition that an interface (IF) as an output destination determined for a session to which the packet belongs exists in another network processor, transmits said packet and IF specifying information which specifies said IF to said other network processor and, when receiving a packet and IF specifying information from the other network processor, outputs said packet to an IF specified by said IF specifying information, wherein the packet comprises a fragment Internet Protocol (IP) packet wherein each of the plurality of network processors includes an IP fragmentation table having an entry in which a fragment offset and a fragment IF specifying information of an IF to be an output destination of the fragment IP packet is registered that correlates with a transmission source IP address and a destination IP address of the fragment IP packet, wherein, when one of the plurality of network processors receives the fragment IP packet through an external network, the one of the plurality of network processors searches the IP fragmentation table, wherein, when there exists an entry in the IP fragmentation table in which a same transmission source IP address, destination IP address and fragment offset as a transmission source IP address, a destination IP address, and a fragment offset of the fragment IP packet are registered, the one of the plurality of network processors obtains the IF specifying information in the entry and updates the fragment offset in the entry, based on a packet length of the fragment IP packet, and wherein, when there exists no relevant entry in the IP fragmentation table, the one of the plurality of network processors searches for the IF specifying information of an IF to be an output destination of the fragment IP packet, registers the searched IF specifying information, and adds a new entry including the transmission source IP address, the destination IP address, and the fragment offset in the fragment IP packet.

15. The packet relay device as set forth in claim 14, wherein one the plurality of network processors, when receiving a packet for closing a session from either the external network or another of the plurality of network processors, deletes information related to a session to which the packet belongs from a session table.

16. A programmable storage medium tangibly embodying a program for causing a computer to function as a network processor, said network processor joining with a plurality of other network processors to form a packet relay device, said network processor, when receiving a packet from an external network, on condition that an interface as an output destination determined for a session to which the packet is associated with another network processor, transmits said packet and IF specifying information specifying said IF to said other network processor and, when receiving a packet and IF specifying information from the other network processor, outputs said packet to an IF specified by said IF specifying information, wherein the packet comprises a fragment Internet Protocol (IP) packet wherein each of the plurality of network processors includes an IP fragmentation table having an entry in which a fragment offset and a fragment IF specifying information of an IF to be an output destination of the fragment IP packet is registered that correlates with a transmission source IP address and a destination IP address of the fragment IP packet wherein, when one of the plurality of network processors receives the fragment IP packet through an external network, the one of the plurality of network processors searches the IP fragmentation table, wherein, when there exists an entry in the IP fragmentation table in which a same transmission source IP address, destination IP address, and fragment offset as a transmission source IP address, a destination IP address, and a fragment offset of the fragment IP packet are registered, the one of the plurality of network processors obtains the IF specifying information in the entry and updates the fragment offset in the entry based on a packet length of the fragment IP packet, and wherein, when there exists no relevant entry in the IP fragmentation table, the one of the plurality of network processors searches for the IF specifying information of an IF to be an output destination of the fragment IP packet, registers the searched IF specifying information, and adds a new entry including the transmission source IP address, the destination IP address, and the fragment offset in the fragment IP packet.

17. The programmable storage medium as set forth in claim 16, wherein one the plurality of network processors, when receiving a packet for closing a session from either the external network or another of the plurality of network processors, deletes information related to a session to which the packet belongs from a session table.

* * * * *